US009458318B2

(12) United States Patent
Greszta-Franz et al.

(10) Patent No.: US 9,458,318 B2
(45) Date of Patent: Oct. 4, 2016

(54) POLYISOCYANATE MIXTURES

(75) Inventors: Dorota Greszta-Franz, Solingen (DE);
Hans-Josef Laas, Odenthal (DE);
Reinhard Halpaap, Odenthal (DE);
Dieter Mager, Leverkusen (DE);
Hans-Ulrich Meier-Westhues,
Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 223 days.

(21) Appl. No.: 13/811,088

(22) PCT Filed: Jul. 15, 2011

(86) PCT No.: PCT/EP2011/062175
§ 371 (c)(1),
(2), (4) Date: Feb. 22, 2013

(87) PCT Pub. No.: WO2012/010523
PCT Pub. Date: Jan. 26, 2012

(65) Prior Publication Data
US 2013/0158146 A1 Jun. 20, 2013

(30) Foreign Application Priority Data

Jul. 20, 2010 (DE) .................. 10 2010 031 683

(51) Int. Cl.
| C08G 18/72 | (2006.01) |
|---|---|
| C08L 75/04 | (2006.01) |
| C08G 18/38 | (2006.01) |
| C08G 18/42 | (2006.01) |
| C08G 18/66 | (2006.01) |
| C08G 18/76 | (2006.01) |
| C08G 18/78 | (2006.01) |
| C08G 18/79 | (2006.01) |
| G02B 1/04 | (2006.01) |

(52) U.S. Cl.
CPC ........... *C08L 75/04* (2013.01); *C08G 18/3876* (2013.01); *C08G 18/4211* (2013.01); *C08G 18/4277* (2013.01); *C08G 18/664* (2013.01); *C08G 18/724* (2013.01); *C08G 18/765* (2013.01); *C08G 18/7628* (2013.01); *C08G 18/7642* (2013.01); *C08G 18/7831* (2013.01); *C08G 18/792* (2013.01); *C08G 18/794* (2013.01); *C08G 18/795* (2013.01); *C08G 18/798* (2013.01); *G02B 1/041* (2013.01)

(58) Field of Classification Search
CPC ........... C08G 18/724; C08G 18/7628; C08G 18/7642; C08G 18/765; C08G 18/7831; C08G 18/792; C08G 18/794; C08G 18/795; C08G 18/798; G02B 1/041
See application file for complete search history.

(56) References Cited

U.S. PATENT DOCUMENTS

| 2,834,748 A | 5/1958 | Bailey et al. |
|---|---|---|
| 2,917,480 A | 12/1959 | Bailey et al. |
| 4,096,162 A | 6/1978 | Windemuth et al. |
| 4,419,513 A | 12/1983 | Breidenbach et al. |
| 4,625,052 A | 11/1986 | König et al. |
| 4,680,369 A | 7/1987 | Kajimoto et al. |
| 4,689,387 A | 8/1987 | Kajimoto et al. |
| 4,774,263 A | 9/1988 | Weber et al. |
| 4,774,264 A | 9/1988 | Weber et al. |
| 4,837,359 A | 6/1989 | Woynar et al. |
| 4,960,848 A | 10/1990 | Scholl et al. |
| 4,994,541 A | 2/1991 | Dell et al. |
| 5,076,958 A | 12/1991 | Pedain et al. |
| 5,126,170 A | 6/1992 | Zwiener et al. |
| 5,143,779 A | 9/1992 | Newkirk et al. |
| 5,270,433 A * | 12/1993 | Klauck et al. ............... 524/158 |
| 5,310,847 A | 5/1994 | Yean et al. |
| 5,461,135 A * | 10/1995 | Malofsky et al. ............ 528/60 |
| 5,645,938 A | 7/1997 | Crandall |
| 5,914,373 A | 6/1999 | Glancy et al. |
| 6,090,939 A | 7/2000 | Richter et al. |
| 6,107,484 A | 8/2000 | Richter et al. |
| 6,316,662 B1 | 11/2001 | Woo et al. |
| 6,506,811 B2 | 1/2003 | Hinrichs et al. |
| 6,730,768 B2 | 5/2004 | Heidbreder et al. |
| 8,716,427 B2 | 5/2014 | Imai et al. |
| 2002/0133040 A1 | 9/2002 | Woo et al. |
| 2004/0249108 A1 | 12/2004 | Dietrich et al. |
| 2005/0239989 A1* | 10/2005 | Haberle et al. .............. 528/44 |
| 2008/0308226 A1 | 12/2008 | Imai et al. |
| 2009/0018271 A1 | 1/2009 | Ohno et al. |

FOREIGN PATENT DOCUMENTS

| DE | 1 012 602 A | 7/1957 |
|---|---|---|
| DE | 1 670 666 A | 7/1971 |
| DE | 1 719 238 A | 1/1972 |
| DE | 2 558 523 A | 7/1977 |

(Continued)

OTHER PUBLICATIONS

Laas et al., J. Prakt. Chem. 336, 1994, 185-200 (English translation provided) cited on pp. 4 & 5 of the specification.

(Continued)

*Primary Examiner* — John Cooney

(74) *Attorney, Agent, or Firm* — Drinker Biddle & Reath LLP

(57) ABSTRACT

The invention relates to novel solvent-free, monomer-depleted polyisocyanate mixtures, and to the use thereof for producing light-resistant and weather-resistant polyurethane bodies with high optical refraction and low optical dispersion.

10 Claims, No Drawings

(56) References Cited

FOREIGN PATENT DOCUMENTS

| | | | |
|---|---|---|---|
| DE | 2 622 951 A | 11/1977 |
| DE | 2 948 419 A | 8/1981 |
| DE | 37 00 209 A1 | 7/1988 |
| DE | 39 00 053 A1 | 7/1990 |
| DE | 19 701 835 A | 7/1998 |
| EP | 0 047 452 A | 3/1982 |
| EP | 0 081 701 A | 6/1983 |
| EP | 0 081 713 A | 6/1983 |
| EP | 0 157 088 A1 | 10/1985 |
| EP | 0 180 873 A2 | 5/1986 |
| EP | 0 235 743 A | 9/1987 |
| EP | 0 268 896 A | 6/1988 |
| EP | 0 271 839 A | 6/1988 |
| EP | 0 339 396 A1 | 4/1989 |
| EP | 0 329 388 A2 | 8/1989 |
| EP | 0 330 966 A | 9/1989 |
| EP | 0 336 205 A | 10/1989 |
| EP | 0 377 177 A1 | 7/1990 |
| EP | 0 378 895 A1 | 7/1990 |
| EP | 0 403 921 A | 12/1990 |
| EP | 0 408 459 A | 1/1991 |
| EP | 0 506 315 A | 9/1992 |
| EP | 0 586 091 A | 3/1994 |
| EP | 0 478 990 B | 6/1995 |
| EP | 0 659 792 A | 6/1995 |
| EP | 0 676 428 A1 | 10/1995 |
| EP | 0 689 556 A | 1/1996 |
| EP | 0 693 512 A | 1/1996 |
| EP | 0 798 299 A | 10/1997 |
| EP | 0 803 743 A | 10/1997 |
| EP | 0 962 455 A1 | 12/1999 |
| EP | 0 978 523 A | 2/2000 |
| EP | 1 000 955 A | 5/2000 |
| EP | 0 937 110 A | 1/2001 |
| EP | 1 484 350 A | 12/2004 |
| EP | 1 640 394 A | 3/2006 |
| EP | 1 767 559 A | 3/2007 |
| EP | 1 772 506 A1 | 4/2007 |
| EP | 2 065 415 A1 | 6/2009 |
| JP | H 07 324118 A | 12/1995 |
| JP | 2005 089734 A2 | 4/2005 |
| JP | 2010 024386 A | 2/2010 |
| JP | 2010 059362 A | 3/2010 |

OTHER PUBLICATIONS

Adam et al.: "Polyurethanes", Ullmann's Encyclopedia of Industrial Chemistry, Electronic Release, 7th ed., chap. 3.2-3.4, Wiley-VCH, Weinheim 2005.
Kunststoff-Handbuch, vol. VII, published by Vieweg and Höchtlen, Carl-Hanser-Verlag, Munich 1966, e.g. on pp. 108 and 109, 453 to 455 and 507 to 510.
English translation of International Search Report mailed Oct. 31, 2011.
Japanese first Office Action and English translation from corresponding application JP 2013-520084, dated May 26, 2015.

* cited by examiner

POLYISOCYANATE MIXTURES

This application is a 371 PCT/EP2011/062175, filed Jul. 15, 2011, which claims foreign priority benefit under 35 U.S.C. 0119 of the German Patent Application No. 10 2010 031 683.0 filed Jul. 20, 2010, the disclosures of which are incorporated herein by reference.

The production of light-fast and weather-resistant plastics by reaction of aliphatic or cycloaliphatic polyisocyanates with compounds containing acidic hydrogen atoms is known. Depending on the nature of the H-acidic reactants, such as, for example, polyols, polyamines and/or polythiols, polyaddition products with, for example, urethane, urea and/or thiourethane structures are thereby obtained.

The general term "polyurethanes" is also used synonymously hereinbelow for the large number of different polymers which can be prepared from polyisocyanates and H-acidic compounds.

For various applications, for example as a light-weight substitute for mineral glass for the production of glazing for automotive and aircraft construction or as casting compounds for optical, electronic or optoelectronic components, a growing interest in transparent, light-fast polyurethane compositions is nowadays to be noted on the market.

For high-quality optical applications in particular, such as, for example, for lenses or spectacle lenses, there is generally a desire for plastics materials which exhibit high light refraction and, at the same time, low dispersion (high Abbe coefficient).

The production of transparent polyurethane compositions having a high refractive index has already been described many times. In general, there are used as the polyisocyanate components so-called araliphatic diisocyanates, that is to say diisocyanates whose isocyanate groups are bonded via aliphatic radicals to an aromatic system. Owing to their aromatic structures, araliphatic diisocyanates yield polyurethanes which have a high refractive index; at the same time, the aliphatically bonded isocyanate groups ensure the light fastness and low yellowing tendency required for high-quality applications.

U.S. Pat. No. 4,680,369 and U.S. Pat. No. 4,689,387 describe polyurethanes and polythiourethanes which are suitable, for example, as lens materials and in the production of which specific sulfur-containing polyols and mercapto-functional aliphatic compounds are combined with araliphatic diisocyanates, such as, for example, 1,3-bis(isocyanatomethyl)benzene (m-xylylene diisocyanate, m-XDI), 1,4-bis(isocyanatomethyl)benzene (p-xylylene diisocyanate, p-XDI), 1,3-bis(2-isocyanatopropan-2-yl)benzene (m-tetramethylxylylene diisocyanate, m-TMXDI) or 1,3-bis(isocyanatomethyl)-2,4,5,6-tetrachlorobenzene, in order to achieve particularly high refractive indices.

Araliphtic diisocyanates, such as m- and p-XDI or m-TMXDI, are also mentioned in a large number of further publications, such as, for example, EP-A 0 235 743, EP-A 0 268 896, EP-A 0 271 839, EP-A 0 408 459, EP-A 0 506 315, EP-A 0 586 091 and EP-A 0 803 743, as the preferred polyisocyanate components for the production of highly refractive lens materials. They thereby serve as crosslinker components for polyols and/or polythiols and, depending on the reactant, yield transparent plastics having high refractive indices in the range from 1.56 to 1.67 and comparatively high Abbe coefficients of up to 45.

However, a common feature of all the processes mentioned hitherto for the production of highly refractive polyurethane compositions for optical applications is the considerable disadvantage that they employ large amounts of low molecular weight monomeric araliphatic diisocyanates, which are categorised as detrimental to health, sensitising or even toxic materials and some of which have a high vapour pressure. For reasons of hygiene in the workplace, the processing of those monomeric diisocyanates requires a high outlay in terms of safety. Moreover, there is the possibility that, in particular when using a polyisocyanate excess, as is proposed, for example, in EP-A 0 235 743 or EP-A 0 506 315, unreacted monomeric diisocyanate will remain in the manufactured moulding, for example a spectacle lens, for a prolonged period and may slowly evaporate therefrom.

The main reason for using the araliphatic diisocyanates in monomeric form is that the known low-monomer derivatives of those diisocyanates are high-viscosity or even solid compounds at conventional processing temperatures and are not suitable as such for solvent-free applications such as the production of casting compounds. Low-monomer polyisocyanates based on araliphatic diisocyanates are nowadays used only in solution in organic solvents, for example for surface coatings, adhesives or printing inks It was an object of the present invention to provide novel highly transparent, light- and weather-resistant polyurethane compositions having high light refraction and low dispersion, which do not exhibit the disadvantages of the known systems. The novel polyurethane compositions are to be based on toxicologically harmless raw materials, and it is to be possible to process them by conventional methods, for example by simple casting by hand or with the aid of suitable machines, for example by the RIM process, to highly crosslinked transparent moulded bodies in particular for high-quality optical applications.

It has been possible to achieve that object by the provision of the polyisocyanate mixtures described in greater detail hereinbelow and the polyurethanes obtainable therefrom.

The invention described in greater detail hereinbelow is based on the surprising observation that solvent-free mixtures of low-viscosity HDI polyisocyanates and low-monomer polyisocyanates based on araliphatic diisocyanates exhibit sufficiently low viscosities, even with relatively low contents of HDI polyisocyanates, that they can be processed under conventional conditions without difficulty to light-fast, non-yellowing polyurethane bodies which are distinguished by high light refraction and, at the same time, a high Abbe coefficient.

Although EP-A 0 329 388 and EP-A 0 378 895, for example, which provide processes for the production of polythiourethane and polyurethane plastics lenses, as well as containing comprehensive lists of diisocyanates which are potentially suitable as chain-extension components, which include inter alia araliphatic diisocyanates, such as, for example, XDI, bis(isocyanatoethyl)benzene, bis(isocyanatopropyl)benzene, TMXDI, bis(isocyanatobutyl)benzene, bis(isocyanatomethyl)naphthalene or bis(isocyanatomethyl) diphenyl ether, also contain the very general indication that prepolymers, urethanes, carbodiimides, ureas, biurets, dimers and trimers of the mentioned diisocyanates also represent suitable starting polyisocyanates for the production of lens materials, the person skilled in the art could find no concrete reference in those publications to the particular suitability of the low-monomer polyisocyanate components described in greater detail hereinbelow, which consist of mixtures of low-viscosity HDI polyisocyanates with araliphatic polyisocyanates, for the production of plastics compositions having a high refractive index. In fact, the examples of all those publications were conducted using only monomeric diisocyanates, including m-XDI and m-TMXDI.

The present invention provides solvent-free, low-monomer polyisocyanate mixtures A) having a content of isocyanate groups of from 11 to 23 wt. % and a mean isocyanate functionality of at least 2.3, which mixtures consist of from 5 to 95 wt. % of at least one polyisocyanate a-1) based on hexamethylene diisocyanate having an NCO content of from 16 to 24 wt. %, and from 5 to 95 wt. % of at least one polyisocyanate a-2) based on araliphatic diisocyanates having an NCO content of from 10 to 22 wt. %.

The invention also provides a process for the production of light-fast polyurethane compositions by the solvent-free reaction of those
A) low-monomer polyisocyanate mixtures with
B) reactants that are reactive towards isocyanate groups and have a mean functionality of from 2.0 to 6.0, and optionally with the concomitant use of
C) further auxiliary substances and additives,
while maintaining an equivalent ratio of isocyanate groups to isocyanate-reactive groups of from 0.5:1 to 2.0:1.

Finally, the invention also provides the use of the light-fast polyurethane compositions so obtainable in the production of transparent, compact or foamed moulded bodies.

The polyisocyanate component A) according to the invention is solvent-free mixtures of from 5 to 95 wt. % of at least one polyisocyanate a-1) based on HDI and from 5 to 95 wt. % of at least one polyisocyanate a-2) based on araliphatic diisocyanates.

The polyisocyanates a-1) are the derivatives of HDI, known per se, which contain uretdione, isocyanurate, iminooxadiazinedione, urethane, allophanate, biuret and/or oxadiazinetrione groups and have a viscosity at 23° C. of from 70 to 12,000 mPas, a content of isocyanate groups of from 16 to 24 wt. %, a content of monomeric HDI of less than 0.5 wt. % and an average isocyanate functionality of at least 2.0.

They are described by way of example in Laas et al., J. Prakt. Chem. 336, 1994, 185-200, DE-A 1 670 666, DE-A 3 700 209, DE-A 3 900 053, EP-A 0 330 966, EP-A 0 336 205, EP-A 0 339 396 and EP-A 0 798 299.

The polyisocyanates of component a-1) are preferably HDI-based polyisocyanates of the above-mentioned type with a uretdione, allophanate, isocyanurate and/or iminooxadiazinetrione structure, which have a viscosity at 23° C. of from 70 to 1600 mPas and a content of isocyanate groups of from 18 to 24 wt. %.

The polyisocyanates of component a-1) are particularly preferably HDI polyisocyanates of the above-mentioned type which contain uretdione groups, isocyanurate groups and/or imino-oxadiazinedione groups and have a viscosity at 23° C. of from 80 to 1500 mPas and a content of isocyanate groups of from 20 to 24 wt. %.

The polyisocyanates of component a-2) are polyisocyanates based on araliphatic diisocyanates and containing uretdione, isocyanurate, iminooxadiazinedione, urethane, allophanate, biuret and/or oxadiazinetrione groups, which polyisocyanates, at 23° C., are in solid form or have a viscosity of more than 150,000 mPas and whose content of isocyanate groups is from 10 to 22 wt. % and of monomeric araliphatic diisocyanates is less than 1.0 wt. %.

Suitable araliphatic starting diisocyanates for the preparation of the polyisocyanate components a-2) are any desired diisocyanates whose isocyanate groups are bonded via optionally branched aliphatic radicals to an aromatic compound which is optionally further substituted, such as, for example, 1,3-bis(isocyanatomethyl)benzene (m-xylylene diisocyanate, m-XDI), 1,4-bis(isocyanatomethyl)benzene (p-xylylene diisocyanate, p-XDI), 1,3-bis(2-isocyanatopropan-2-yl)benzene (m-tetramethylxylylene diisocyanate, m-TMXDI), 1,4-bis(2-isocyanatopropan-2-yl)benzene (p-tetramethylxylylene diisocyanate, p-TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butylbenzene, 1,3-bis(isocyanatomethyl)-4-chlorobenzene, 1,3-bis-(isocyanatomethyl)-4,5-dichlorobenzene, 1,3-bis(isocyanatomethyl)-2,4,5,6-tetrachlorobenzene, 1,4-bis(isocyanatomethyl)-2,3,5,6-tetrachlorobenzene, 1,4-bis(isocyanatomethyl)-2,3,5,6-tetrabromobenzene, 1,4-bis(2-isocyanatoethyl)benzene, 1,4-bis(isocyanatomethyl)naphthalene as well as arbitrary mixtures of those diisocyanates.

The preparation of the polyisocyanate components a-2) from the mentioned araliphatic diisocyanates can be carried out by conventional processes for the oligomerisation of diisocyanates, as are described, for example, in Laas et al., J. Prakt. Chem. 336, 1994, 185-200, with subsequent separation of the unreacted monomeric diisocyanates by distillation or extraction. Concrete examples of low-monomer polyisocyanates of araliphatic diisocyanates are to be found, for example, in JP-A 2005161691, JP-A 2005162271 and EP-A 0 081 713.

Preferred polyisocyanates a-2) are those with a uretdione, allophanate, isocyanurate, iminooxadiazinedione and/or biuret structure.

The polyisocyanates a-2) are particularly preferably those of the above-described type which are based on m-XDI, p-XDI and/or m-TMXDI and have a content of isocyanate groups of from 11 to 21.5 wt. % and a content of monomeric diisocyanates of less than 0.8%.

Most particularly preferred polyisocyanates of component a-2) are those of the above-described type which are based on m-XDI and have a content of isocyanate groups of from 15 to 21 wt. % and a content of monomeric XDI of less than 0.5%.

Both the HDI used to prepare the polyisocyanate component a-1) and the mentioned araliphatic starting diisocyanates for the polyisocyanate components a-2) can be prepared by any desired processes, for example by phosgenation in the liquid phase or gas phase or in a phosgene-free manner, for example by urethane cleavage.

The preparation of the polyisocyanate mixtures A) according to the invention is carried out by simply mixing the individual components a-1) and a-2), optionally preheated to temperatures of from 30 to 240°, in the relative proportions indicated above, preferably while maintaining a weight ratio a-1) : a-2) of from 90:10 to 10:90, particularly preferably from 80:20 to 20:80, and then stirring the mixture until it is homogeneous, the temperature of the mixture being maintained, optionally by further heating, at a temperature of from 30 to 140° C., preferably from 40 to 100° C.

In a preferred embodiment, in the preparation of the polyisocyanate mixtures A), the preparation of polyisocyanate component a-2), which is highly viscous or solid at 23° C., for example by urethanisation, allophanatisation, biuretisation and/or by catalytic oligomerisation of araliphatic diisocyanates, is immediately followed, after separation of the monomers by thin-layer distillation, by the addition of polyisocyanate component a-2), while it is still warm, for example at temperatures of from 100 to 240° C., to polyisocyanate component a-1), which is optionally likewise heated, and the mixture is stirred, optionally with further heating, until it is homogeneous.

In another embodiment, which is likewise preferred, in the preparation of the polyisocyanate mixtures A), the polyisocyanate component a-1) is stirred into the crude solution that is present at the end of the reaction for the preparation of polyisocyanate component a-2), before the thin-layer distillation, and excess monomeric araliphatic diisocyanates are only separated off thereafter.

Irrespective of the nature of their preparation, the polyisocyanate mixtures A) are generally obtained in the form of clear, virtually colourless resins whose viscosity at 23° C. is preferably from 4000 to 100,000 mPas, particularly preferably from 6000 to 60,000 mPas, whose content of isocyanate groups is preferably from 12 to 23 wt. %, particularly preferably from 16 to 22 wt. %, and whose mean isocyanate functionality is preferably from 2.5 to 5.0, particularly preferably from 3.0 to 4.5. The polyisocyanate mixtures A) are low in residual monomers, because they have a residual content of monomeric diisocyanates (sum of monomeric HDI and monomeric araliphatic diisocyanates) of less than 1 wt. %, preferably less than 0.5 wt. %, particularly preferably less than 0.3 wt. %.

For the production of light-fast polyurethane compositions, the above-described polyisocyanate mixtures A) according to the invention are reacted with any desired solvent-free reactants B) which are reactive towards isocyanate groups and which have a mean functionality, within the meaning of the isocyanate addition reaction, of from 2.0 to 6.0, preferably from 2.5 to 4.0, particularly preferably from 2.5 to 3.5.

These are in particular the conventional polyether polyols, polyester polyols, polyether polyester polyols, polythioether polyols, polymer-modified polyether polyols, graft polyether polyols, in particular those based on styrene and/or acrylonitrile, polyether polyamines, hydroxyl-group-containing polyacetals and/or hydroxyl-group-containing aliphatic polycarbonates known from polyurethane chemistry, which usually have a molecular weight of from 106 to 12,000, preferably from 250 to 8000. A broad overview of suitable reactants B) will be found, for example, in N. Adam et al.: "Polyurethanes", Ullmann's Encyclopedia of Industrial Chemistry, Electronic Release, 7th ed., chap. 3.2-3.4, Wiley-VCH, Weinheim 2005.

Suitable polyether polyols B) are, for example, those of the type mentioned in DE-A 2 622 951, column 6, line 65—column 7, line 47 or in EP-A 0 978 523, page 4, line 45 to page 5, line 14, provided they satisfy the criteria mentioned above in respect of functionality and molecular weight.

Particularly preferred polyether polyols B) are addition products of ethylene oxide and/or propylene oxide with glycerol, trimethylolpropane, ethylenediamine and/or pentaerythritol.

Suitable polyester polyols B) are, for example, those of the type mentioned in EP-A 0 978 523, page 5, lines 17 to 47 or EP-A 0 659 792, page 6, lines 8 to 19, provided they satisfy the criteria mentioned above, preferably those whose hydroxyl number is from 20 to 650 mg KOH/g.

Suitable polythio polyols B) are, for example, the known condensation products of thiodiglycol with itself or with other glycols, dicarboxylic acids, formaldehyde, aminocarboxylic acids or amino alcohols. Depending on the nature of the components of the mixture that are used, the polythio polyols B) are polythio mixed ether polyols, polythioether ester polyols or polythioether ester amide polyols.

Polyacetal polyols suitable as component B) are, for example, the known reaction products of simple glycols, such as, for example, diethylene glycol, triethylene glycol, 4,4'-dioxethoxy-diphenyl-dimethylmethane (adduct of 2 mol of ethylene oxide with bisphenol A) or hexanediol, with formaldehyde, or also polyacetals prepared by polycondensation of cyclic acetals, such as, for example, trioxane.

Also highly suitable as component B) are amino polyethers or mixtures of amino polyethers, that is to say polyethers having groups that are reactive towards isocyanate groups, which are composed of at least 50 equivalent-%, preferably at least 80 equivalent-%, of primary and/or secondary, aromatically or aliphatically bonded amino groups and, for the remainder, of primary and/or secondary, aliphatically bonded hydroxyl groups. Suitable amino polyethers of this type are, for example, the compounds mentioned in EP-A 0 081 701, column 4, line 26 to column 5, line 40. Likewise suitable as component B) are amino-functional polyether urethanes or ureas, as can be prepared, for example, by the process of DE-A 2 948 419 by hydrolysis of isocyanate-functional polyether prepolymers, or amino-group-containing polyesters of the above-mentioned molecular weight range.

Further suitable components B) that are reactive towards isocyanate groups are, for example, the specific polyols described in EP-A 0 689 556 and EP-A 0 937 110, which are obtainable, for example, by reaction of epoxidised fatty acid esters with aliphatic or aromatic polyols with epoxide ring opening.

Hydroxyl-group-containing polybutadienes can optionally also be used as component B).

For the production of polyurethane compositions having particularly high light refraction there are suitable as components B) that are reactive towards isocyanate groups in particular also polythio compounds, for example simple alkanethiols, such as, for example, methanedithiol, 1,2-ethanedithiol, 1,1-propanedithiol, 1,2-propanedithiol, 1,3-propanedithiol, 2,2-propanedithiol, 1,4-butanedithiol, 2,3-butanedithiol, 1,5-pentanedithiol, 1,6-hexanedithiol, 1,2,3-propanetrithiol, 1,1-cyclohexanedithiol, 1,2-cyclohexanedithiol, 2,2-dimethylpropane-1,3-dithiol, 3,4-dimethoxy-butane-1,2-dithiol and 2-methylcyclohexane-2,3-dithiol, polythiols containing thioether groups, such as, for example, 2,4-dimercaptomethyl-1,5-dimercapto-3-thiapentane, 4-mercaptomethyl-1,8-dimercapto-3,6-dithiaoctane, 4,8-dimercaptomethyl -1,11-dimercapto -3,6,9-trithiaundecane, 4,7-dimercaptomethyl-1,11-dimercapto -3,6,9-trithiaundecane, 5,7-dimercaptomethyl-1,11-dimercapto-3,6,9-trithiaundecane, 4,5-bis(mercaptoethylthio)-1,10-dimercapto-3,8-dithiadecane, tetra-kis(mercaptomethyl) methane, 1,1,3,3-tetrakis(mercaptomethylthio)propane, 1,1,5,5-tetra-kis(mercaptomethylthio)-3-thiapentane, 1,1,6,6-tetrakis(mercaptomethylthio)-3,4-dithiahexane, 2-mercaptoethylthio-1,3-dimercaptopropane, 2,3-bis(mercaptoethylthio)-1-mercaptopropane, 2,2-bis(mercaptomethyl)-1,3-dimercaptopropane, bis(mercaptomethyl)sulfide, bis(mercaptomethyl)disulfide, bis(mercaptoethyl)sulfide, bis(mercaptoethyl)disulfide, bis(mercaptopropyl)sulfide, bis (mercaptopropyl)disulfide, bis(mercaptomethylthio)methane, tris(mercaptomethylthio)methane, bis(mercaptoethylthio)methane, tris(mercaptoethylthio)methane bis (mercaptopropylthio)methane, 1,2-bis(mercaptomethylthio) ethane, 1,2-bis(mercaptoethylthio)ethane, 2-(mercaptoethylthio)-ethane, 1,3-bis(mercaptomethylthio) propane, 1,3-bis(mercaptopropylthio)propane, 1,2,3-tris (mercaptomethylthio)propane, 1,2,3-tris(mercaptoethylthio) propane, 1,2,3-tris(mercaptopropylthio)-propane, tetrakis (mercaptomethylthio)methane, tetrakis (mercaptoethylthiomethyl)methane, tetrakis (mercaptopropylthiomethyl)methane, 2,5-dimercapto-1,4-dithiane, 2,5-bis(mercaptomethyl)-1,4-dithiane and its oligomers obtainable according to JP-A 07118263, 1,5-bis (mercaptopropyl)-1,4-dithiane, 1,5-bis(2-mercaptoethylthiomethyl)-1,4-dithiane, 2-mercaptomethyl-6-mercapto-1,4-dithiacycloheptane, 2,4,6-trimercapto-1,3,5-trithiane, 2,4,6-trimercaptomethyl-1,3,5-trithiane and 2-(3-bis (mercaptomethyl)-2-thiapropyl)-1,3-dithiolane, polyester thiols, such as, for example, ethylene glycol bis(2-mercaptoacetate), ethylene glycol bis(3-mercaptopropionate), diethylene glycol(2-mercaptoacetate), diethylene glycol(3-mercaptopropionate), 2,3-dimercapto-1-propanol(3-mercaptopropionate), 3-mercapto-1,2-propanediol bis(2-mercaptoacetate), 3-mercapto-1,2-propanediol bis(3-mercaptopropionate), trimethylolpropane tris(2-mercaptoacetate), trimethylolpropane tris(3-mercaptopropionate), trimethylolethane tris(2-mercaptoacetate), trimethylolethane tris(3-mercaptopropionate), pentaerythritol tetrakis(2-mercaptoacetate), pentaerythritol tetrakis(3-mercaptopropionate), glycerol tris(2-mercaptoacetate), glycerol tris(3-mercaptopropionate), 1,4-cyclohexanediol bis(2-mercaptoacetate), 1,4-cyclohexanediol bis(3-mercaptopropionate), hydroxymethyl sulfide bis(2-mercaptoacetate), hydroxymethyl sulfide bis(3-mercaptopropionate), hydroxyethyl sulfide (2-mercaptoacetate), hydroxyethyl sulfide (3-mercaptopropionate), hydroxymethyl disulfide (2-mercaptoacetate), hydroxymethyl disulfide (3-mercaptopropionate), (2-mercaptoethyl ester) thioglycolate and bis (2-mercaptoethyl ester) thiodipropionate as well as aromatic thio compounds, such as, for example, 1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis (mercaptoethyl)benzene, 1,2,3-trimercaptobenzene, 1,2,4-trimercaptobenzene, 1,3,5-trimercaptobenzene, 1,2,3-tris (mercaptomethyl)benzene, 1,2,4-tris(mercaptomethyl) benzene, 1,3,5-tris(mercaptomethyl)benzene, 1,2,3-tris (mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3, 4-tetramercaptobenzene, 1,2,3,5-tetramercaptobenzene, 1,2, 4,5-tetramercaptobenzene, 1,2,3,4-tetrakis(mercaptomethyl) benzene, 1,2,3,5-tetrakis(mercaptomethyl)benzene, 1,2,4,5-tetrakis(mercaptomethyl)benzene, 1,2,3,4-tetrakis (mercaptoethyl)benzene, 1,2,3,5-tetrakis(mercaptoethyl) benzene, 1,2,4,5-tetrakis(mercaptoethyl)benzene, 2,2'-dimercaptobiphenyl and 4,4'-dimercaptobiphenyl.

Preferred polythio compounds B) are polythioether and polyester thiols of the mentioned type. Particularly preferred polythio compounds B) are 4-mercaptomethyl-1,8-dimercapto-3,6-dithiaoctane, 2,5-bismercaptomethyl-1,4-dithiane, 1,1,3,3-tetrakis(mercaptomethylthio)propane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, trimethylolpropane tris(3-mercaptopropionate), trimethylolethane tris(2-mercaptoacetate), pentaerythritol tetrakis(2-mercaptoacetate) and pentaerythritol tetrakis(3-mercaptopropionate).

In addition, sulfur-containing hydroxy compounds are also suitable as components B) that are reactive towards isocyanate groups. There may be mentioned here as examples simple mercapto alcohols, such as, for example, 2-mercaptoethanol, 3-mercaptopropanol, 1,3-dimercapto-2-propanol, 2,3-dimercaptopropanol and dithioerythritol, alcohols containing thioether structures, such as, for example, di(2-hydroxyethyl)sulfide, 1,2-bis(2-hydroxyethylmercapto)ethane, bis(2-hydroxyethyl)disulfide and 1,4-dithiane-2,5-diol, or sulfur-containing diols having a polyester urethane, polythioester urethane, polyester thiourethane or polythioester thiourethane structure of the type mentioned in EP-A 1 640 394.

In the production of the light-fast polyurethane compositions according to the invention there can also be used as isocyanate-reactive compounds B) low molecular weight, hydroxy- and/or amino-functional components, that is to say those having a molecular weight in the range from 60 to 500, preferably from 62 to 400.

These are, for example, simple mono- or poly-hydric alcohols having from 2 to 14 carbon atoms, preferably from 4 to 10 carbon atoms, such as, for example, 1,2-ethanediol, 1,2- and 1,3-propanediol, the isomeric butanediols, pentanediols, hexanediols, heptanediols and octanediols, 1,10-decanediol, 1,2- and 1,4-cyclohexanediol, 1,4-cyclohexanedimethanol, 4,4'-(1-methylethylidene)-biscyclohexanol, 1,2,3-propanetriol, 1,1,1-trimethylolethane, 1,2,6-hexanetriol, 1,1,1-trimethylolpropane, 2,2-bis(hydroxymethyl)-1,3-propanediol, bis-(2-hydroxyethyl)-hydroquinone, 1,2,4- and 1,3,5-trihydroxycyclohexane or 1,3,5-tris(2-hydroxyethyl)-isocyanurate.

Examples of suitable low molecular weight amino-functional compounds are, for example, aliphatic and cycloaliphatic amines and amino alcohols having primary- and/or secondary-bonded amino groups, such as, for example, cyclohexylamine, 2-methyl-1,5-pentanediamine, diethanolamine, monoethanolamine, propylamine, butylamine, dibutylamine, hexylamine, monoisopropanolamine, diisopropanolamine, ethylenediamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethylpiperazine, 1,2-diaminocyclohexane, triethylenetetramine, tetraethylenepentamine, 1,8-p-diaminomenthane, bis(4-amino cyclohexyl)methane, bis(4-amino-3-methylcyclohexyl)methane, bis(4-amino-3,5-dimethylcyclohexyl)methane, bis(4-amino-2,3,5-trimethylcyclohexyl)methane, 1,1-bis(4-aminocyclohexyl) propane, 2,2-bis(4-aminocyclohexyl)propane, 1,1-bis(4-aminocyclohexyl)ethane, 1,1-bis(4-aminocyclohexyl) butane, 2,2-bis(4-aminocyclohexyl)butane, 1,1-bis(4-amino-3-methylcyclohexyl)ethane, 2,2-bis(4-amino-3-methylcyclohexyl)propane, 1,1-bis(4-amino-3,5-dimethylcyclohexyl)ethane, 2,2-bis(4-amino-3,5-dimethylcyclohexyl)propane, 2,2-bis(4-amino-3,5-dimethyl cyclohexyl)butane, 2,4-diaminodicyclohexylmethane, 4-aminocyclohexyl-4-amino-3-methylcyclohexylmethane, 4-amino-3,5-dimethylcyclohexyl-4-amino-3-methylcyclohexylmethane and 2-(4-aminocyclohexyl)-2-(4-amino-3-methylcyclohexyl)methane.

Examples of aromatic polyamines, in particular diamines, having molecular weights below 500 which constitute suitable isocyanate-reactive compounds B) are, for example, 1,2- and 1,4-diaminobenzene, 2,4- and 2,6-diaminotoluene, 2,4'- and/or 4,4'-diaminodiphenylmethane, 1,5-diaminonaphthalene, 4,4',4"-triaminotriphenylmethane, 4,4'-bis(methylamino)-diphenylmethane or 1-methyl-2-methylamino-4-aminobenzene, 1-Methyl-3,5-diethyl-2,4-diaminobenzene, 1-methyl-3,5-diethyl-2,6- diaminobenzene, 1,3,5-trimethyl-2,4-diaminobenzene, 1,3,5-triethyl-2,4-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane, 3,3'-diethyl-5,5'-diisopropyl-4,4'-diaminodiphenylmethane, 1-methyl-2,6-diamino-3-isopropylbenzene, liquid mixtures of polyphenylpolymethylene polyamines, as are obtainable in known manner by condensation of aniline with formaldehyde, as well as arbitrary mixtures of such polyamines In this connection, particular mention may be made, for example, of mixtures of 1-methyl-3,5-diethyl-2,4-diaminobenzene with 1-methyl-3,5-diethyl-2,6-diaminobenzene in a weight ratio of from 50:50 to 85:15, preferably from 65:35 to 80:20.

The use of low molecular weight amino-functional polyethers having molecular weights below 500 is likewise possible. These are, for example, those having primary and/or secondary, aromatically or aliphatically bonded amino groups, whose amino groups are optionally bonded via urethane or ester groups to the polyether chains and which are obtainable by known processes which have already been described above for the preparation of the higher molecular weight amino polyethers.

Sterically hindered aliphatic diamines having two secondary-bonded amino groups can optionally also be used as components B) that are reactive towards isocyanate groups, such as, for example, the reaction products, known from EP-A 0 403 921, of aliphatic and/or cycloaliphatic diamines with maleic acid or fumaric acid esters, the bisadduct of acrylonitrile with isophoronediamine, which is obtainable according to the teaching of EP-A 1 767 559, or the hydrogenation products, described, for example, in DE-A 19 701 835, of Schiff bases obtainable from aliphatic and/or cycloaliphatic diamines and ketones, such as, for example, diisopropyl ketone.

Preferred reactants B) for the polyisocyanate mixtures A) according to the invention are the above-mentioned polymeric polyether polyols, polyester polyols and/or amino polyethers, the mentioned polythio compounds, low molecular weight aliphatic and cycloaliphatic polyhydric alcohols, as well as the mentioned low molecular weight polyvalent amines, in particular sterically hindered aliphatic diamines having two secondary-bonded amino groups.

Also suitable as reactants for the polyisocyanate mixtures A) according to the invention are arbitrary mixtures of the components B) reactive towards isocyanate groups that have been mentioned by way of example above. While the use of only hydroxy-functional components B) yields pure polyurethane compositions, the use of only thio compounds B) yields pure polythiourethanes and the use of only polyamines B) yields pure polyurea compositions, it is possible by using amino alcohols, mercapto alcohols or suitable mixtures of hydroxy-, mercapto- and amino-functional compounds as component B) to prepare polyaddition compounds in which the equivalent ratio of urethane groups to thiourethane and/or urea groups can be adjusted as desired.

The polyisocyanate components A) according to the invention, which consist of solvent-free polyisocyanates based on HDI and polyisocyanates based on araliphatic diisocyanates, are generally the only polyisocyanate component used in the production of light-fast polyurethane compositions. In principle, however, it is also possible to use the polyisocyanate components A) in admixture with any desired further solvent-free low-monomer polyisocyanates, for example the solutions, known from EP-A 0 693 512 and EP-A 1 484 350, of cycloaliphatic polyisocyanates in low-viscosity HDI polyisocyanates, the polyisocyanates described in EP-A 0 047 452 and EP-A 0 478 990 and obtainable by dimerisation and/or trimerisation of mixtures of HDI and isophorone diisocyanate, or polyester-modified HDI polyisocyanates of the type known from EP-A 0 336 205.

Irrespective of the nature of the chosen starting materials, the reaction of the polyisocyanate mixtures A) according to the invention with the components B) that are reactive towards isocyanate groups is carried out while maintaining an equivalent ratio of isocyanate groups to isocyanate-reactive groups of from 0.5:1 to 2.0:1, preferably from 0.7:1 to 1.3:1, particularly preferably from 0.8:1 to 1.2:1.

In addition to the mentioned starting components A) and B), further auxiliary substances and additives C), such as, for example, catalysts, foaming agents, surface-active agents, UV stabilisers, foam stabilisers, antioxidants, mould release agents, fillers and pigments, can optionally be used concomitantly.

In order to accelerate the reaction it is possible to use, for example, conventional catalysts known from polyurethane chemistry. Examples which may be mentioned here include tertiary amines, such as, for example, triethylamine, tributylamine, dimethylbenzylamine, diethylbenzylamine, pyridine, methylpyridine, dicyclohexylmethylamine, dimethylcyclohexylamine, N,N,N',N'-tetramethyldiaminodiethyl ether, bis-(dimethylaminopropyl)-urea, N-methyl- and N-ethyl-morpholine, N-cocomorpholine, N-cyclohexylmorpholine, N,N,N',N'-tetramethylethylenediamine, N,N,N',N'-tetramethyl-1,3-butanediamine, N,N,N',N'-tetramethyl-1,6-hexanediamine, pentamethyldiethylenetriamine, N-methylpiperidine, N-dimethylaminoethylpiperidine, N,N'-dimethylpiperazine, N-methyl-N'-dimethylaminopiperazine, 1,8-diazabicyclo(5.4.0)undec-7-ene (DBU), 1,2-dimethylimidazole, 2-methylimidazole, N,N-dimethylimidazole-β-phenylethylamine, 1,4-diazabicyclo-(2,2,2)-octane, bis-(N,N-dimethylaminoethyl)adipate; alkanolamine compounds, such as, for example, triethanolamine, triisopropanolamine, N-methyl- and N-ethyl-diethanolamine, dimethylaminoethanol, 2-(N,N-dimethylaminoethoxy)ethanol, N,N',N''-tris-(dialkylaminoalkyl)hexahydrotriazines, for example N,N',N''-tris-(dimethylaminopropyl)-s-hexahydrotriazine and/or bis(dimethylaminoethyl) ether; metal salts, such as, for example, inorganic and/or organic compounds of iron, lead, bismuth, zinc and/or tin in conventional oxidation states of the metal, for example iron(II) chloride, iron(III) chloride, bismuth(III) 2-ethylhexanoate, bismuth (III) octoate, bismuth(III) neodecanoate, zinc chloride, zinc 2-ethylcaproate, tin(II) octoate, tin(II) ethylcaproate, tin(II) palmitate, dibutyltin(IV) dilaurate (DBTL), dibutyltin(IV) dichloride or lead octoate; amidines, such as, for example, 2,3-dimethyl-3,4,5,6-tetrahydropyrimidine; tetraalkylammonium hydroxides, such as, for example, tetramethylammonium hydroxide; alkali hydroxides, such as, for example, sodium hydroxide, and alkali alcoholates, such as, for example, sodium methylate and potassium isopropylate, as well as alkali salts of long-chained fatty acids having from 10 to 20 carbon atoms and optionally lateral OH groups.

Catalysts C) which are preferably to be used are tertiary amines, bismuth and tin compounds of the mentioned type.

The catalysts mentioned by way of example can be used in the production of the light-fast polyurethane, polythiourethane and/or polyurea compositions according to the invention on their own or in the form of arbitrary mixtures with one another and are optionally employed in amounts of from 0.01 to 5.0 wt. %, preferably from 0.1 to 2 wt. %, calculated as the total amount of catalysts used, based on the total amount of starting compounds used.

By means of the process according to the invention, transparent, compact mouldings having a high refractive index are preferably produced. However, by the addition of suitable foaming agents it is also possible, if desired, to obtain foamed moulded bodies. Foaming agents suitable therefor are, for example, readily volatile organic substances, such as, for example, acetone, ethyl acetate, halo-substituted alkanes, such as methylene chloride, chloroform, ethylidene chloride, vinylidene chloride, monofluorotrichloromethane, chlorotrifluoromethane or dichlorodifluoromethane, butane, hexane, heptane or diethyl ether and/or dissolved inert gases, such as, for example, nitrogen, air or carbon dioxide.

Suitable chemical foaming agents C), that is to say foaming agents which form gaseous products because of a reaction, for example with isocyanate groups, are, for example, water, compounds containing water of hydration, carboxylic acids, tertiary alcohols, for example tert-butanol, carbamates, for example the carbamates described in EP-A 1 000 955, in particular on page 2, lines 5 to 31 and page 3, lines 21 to 42, carbonates, for example ammonium carbonate and/or ammonium hydrogen carbonate, and/or guanidine carbamate.

A foaming action can also be achieved by addition of compounds which decompose at temperatures above room temperature with the liberation of gases, for example of nitrogen, for example azo compounds such as azodicarbonamide or azoisobutyric acid nitrile. Further examples of foaming agents and details regarding the use of foaming agents are described in Kunststoff-Handbuch, Volume VII, edited by Vieweg and Höchtlen, Carl-Hanser-Verlag, Munich 1966, for example on pages 108 and 109, 453 to 455 and 507 to 510.

It is also possible according to the invention to use surface-active additives C) as emulsifiers and foam stabilisers. Suitable emulsifiers are, for example, the sodium salts of castor oil sulfonates or fatty acids, salts of fatty acides with amines, such as, for example, oleate of diethylamine or stearate of diethanolamine. Alkali or ammonium salts of sulfonic acids, such as, for example, of dodecylbenzenesulfonic acids, fatty acids, such as, for example, ricinoleic acid, or polymeric fatty acids, or ethoxylated nonylphenol can also be used concomitantly as surface-active additives.

Suitable foam stabilisers are in particular the known, preferably water-soluble polyether siloxanes, as are described, for example, in U.S. Pat. No. 2,834,748, DE-A 1 012 602 and DE-A 1 719 238. The polysiloxane-polyoxyalkylene copolymers obtainable according to DE-A 2 558 523 and branched via allophanate groups are also suitable foam stabilisers.

The above-mentioned emulsifiers and stabilisers which are optionally to be used concomitantly in the process according to the invention can be employed both on their own and in arbitrary combinations with one another.

The bodies obtained from the polyurethane compositions which can be prepared or used according to the invention are already distinguished as such, that is to say without the addition of appropriate stabilisers, by very good light resistance. Nevertheless, UV stabilisers (light stabilisers) or antioxidants of the known type can optionally be used concomitantly in their production as further auxiliary substances and additives C).

Suitable UV stabilisers C) are, for example, piperidine derivatives, such as, for example, 4-benzoyloxy-2,2,6,6-tetramethylpiperidine, 4-benzoyloxy-1,2,2,6,6-pentamethyl-piperidine, bis-(2,2,6,6-tetramethyl-4-piperidyl)sebacate, bis(1,2,2,6,6-pentamethyl-4-piperidyl)sebacate, methyl(1,2,2,6,6-pentamethyl-4-piperidyl)sebacate, bis-(2,2,6,6-tetramethyl-4-piperidyl)suberate or bis(2,2,6,6-tetramethyl-4-piperidyl)dodecanedioate, benzophenone derivatives, such as, for example, 2,4-dihydroxy-, 2-hydroxy-4-methoxy-, 2-hydroxy-4-octoxy-, 2-hydroxy-4-dodecyloxy- or 2,2'-dihydroxy-4-dodecyloxy-benzophenone, benztriazole derivatives, such as, for example, 2-(5-methyl-2-hydroxyphenyl)benztriazole, 2-(5-tert-butyl-2-hydroxyphenyl)benztriazole, 2-(5-tert-octyl-2-hydroxyphenyl)benztriazole, 2-(5-dodecyl-2-hydroxyphenyl)benztriazole, 2-(3,5-di-tert-butyl-2-hydroxyphenyl)-5-chlorobenztriazole, 2-(3,5-di-tert-amyl-2-hydroxyphenyl)benztriazole, 2-(3,5-di-tert-butyl-2-hydroxyphenyl)benztriazole, 2-(3-tert-butyl-5-methyl-2-hydroxyphenyl)-5-chlorobenztriazole and esterification products of 2-(3-tert-butyl-5-propionic acid 2-hydroxyphenyl)benztriazole with polyethylene glycol 300, oxalanilides, such as, for example, 2-ethyl-2'-ethoxy- or 4-methyl-4'-methoxy-oxalanilide, salicylic acid esters, such as, for example, salicylic acid phenyl ester, salicylic acid 4-tert-butylphenyl ester and salicylic acid 4-tert-octylphenyl ester, cinnamic acid derivatives, such as, for example, α-cyano-β-methyl-4-methoxycinnamic acid methyl ester, α-cyano-β-methyl-4-methoxycinnamic acid butyl ester, α-cyano-β-phenylcinnamic acid ethyl ester and α-cyano-β-phenylcinnamic acid isooctyl ester, or malonic ester derivatives, such as, for example, 4-methoxy-benzylidenemalonic acid dimethyl ester, 4-methoxybenzylidenemalonic acid diethyl ester and 4-butoxy-benzylidenemalonic acid dimethyl ester. These light stabilisers can be used both on their own and in arbitrary combinations with one another.

Suitable antioxidants C) are, for example, the known sterically hindered phenols, such as, for example, 2,6-di-tert-butyl-4-methylphenol (ionol), pentaerythritol tetrakis(3-(3,5-di-tert-butyl-4-hydroxyphenyl)propionate), octadecyl 3-(3,5-di-tert-butyl-4-hydroxyphenyl)-propionate, triethylene glycol bis(3-tert-butyl-4-hydroxy-5-methylphenyl)propionate, 2,2'-thio-bis(4-methyl-6-tert-butyl-phenol), 2,2'-thiodiethyl bis[3-(3,5-di-tert-butyl-4-hydroxyphenyl)propionate), which are used both on their own and in arbitrary combinations with one another.

Further auxiliary substances and additives C) which are optionally to be used concomitantly are, for example, cell regulators of the type known per se, such as, for example, paraffins or fatty alcohols, the known flame-proofing agents, such as, for example, tris-chloroethyl phosphate, ammonium phosphate or polyphosphate, fillers, such as, for example, barium sulfate, kieselguhr, carbon black, prepared chalk, or glass fibres having a reinforcing effect. Finally, there can optionally also be used concomitantly in the process according to the invention the internal mould release agents, colourings, pigments, hydrolytic stabilisers, and substances having a fungistatic or bacteriostatic action which are known per se.

The mentioned auxiliary substances and additives C) which are optionally to be used concomitantly can be added either to polyisocyanate component A) according to the invention and/or to component B) that is reactive towards isocyanate groups.

The low-monomer polyisocyanate components A) according to the invention consisting of mixtures of low-viscosity HDI polyisocyanates and solid or high-viscosity aralipahtic polyisocyanates are valuable starting materials for the production of polyurethane plastics by the isocyanate polyaddition process.

Owing to their comparatively low viscosity, they can be processed without a solvent but, if required, they can also be diluted to a clear solution with conventional inert solvents known from polyurethane chemistry and used in that form, for example, for surface coating and adhesive applications.

For the production of light-fast bodies from polyurethane compositions, polyisocyanate component A) according to the invention is mixed with component B) that is reactive towards isocyanate groups, optionally with the concomitant use of the above-mentioned auxiliary substances and additives C), in solvent-free form in the equivalent ratio of isocyanate groups to isocyanate-reactive groups indicated above, with the aid of suitable mixing devices, and cured by any desired methods, in open or closed moulds, for example by simple casting by hand, but preferably with the aid of suitable machines, such as, for example, the low-pressure or high-pressure machines conventional in polyurethane technology, or by the RIM process, at a temperature of up to 180° C., preferably from 20 to 140° C., particularly preferably from 40 to 100° C., and optionally under an elevated pressure of up to 300 bar, preferably up to 100 bar, particularly preferably up to 40 bar.

In order to reduce the viscosities, the starting components A) and B) can optionally be preheated to a temperature of up to 120° C., preferably up to 100° C., particularly preferably up to 90° C., and optionally degassed by application of a vacuum.

In general, the bodies manufactured in that manner from the polyurethane compositions which are produced or can be used according to the invention can be removed from the mould after a short time, for example after a time of from 2 to 60 minutes. This can optionally be followed by post-curing at a temperature of from 50 to 100° C., preferably at from 60 to 90° C.

In that manner there are obtained compact or foamed, light- and weather-resistant polyurethane bodies which are distinguished by high resistance to solvents and chemicals as well as outstanding mechanical properties, in particular excellent heat distortion resistance even at relatively high temperatures of, for example, 90° C.

The polyisocyanate mixtures A) according to the invention are preferably used in the production of compact transparent moulded bodies. Such transparent polyurethane bodies are suitable for a large number of different applications, for example for the production of or as glass-substitute glazing, such as, for example, sunroofs, windscreens, rear windows or side windows in automotive or aircraft construction, and also as safety glass.

The polyurethane compositions according to the invention are additionally outstandingly suitable for the transparent casting of optical, electronic or optoelectronic components, such as, for example, solar modules, light-emitting diodes or lenses or collimators, as are used, for example, as supplementary lenses in LED lamps or motor vehicle headlamps.

The preferred field of use for the polyurethane compositions obtainable from the polyisocyanate mixtures A) according to the invention is, however, the production of light-weight plastics spectacle lenses having a high refractive index and a high Abbe coefficient. Spectacle lenses produced according to the invention are distinguished by outstanding mechanical properties, in particular hardness and impact strength, as well as good scratch resistance and, moreover, they are easy to work with and can be coloured as desired.

EXAMPLES

Unless indicated otherwise, all percentages are by weight.

The NCO contents were determined by titrimetry according to DIN EN ISO 11909.

OH numbers were determined by titrimetry in accordance with DIN 53240 Part 2; acid numbers were determined according to DIN 3682.

The residual monomer contents were measured according to DIN EN ISO 10283 by gas chromatography with an internal standard.

All the viscosity measurements were carried out with a Physica MCR 51 rheometer from Anton Paar Germany GmbH (DE) according to DIN EN ISO 3219.

The glass transition temperature Tg was determined by means of DSC (differential scanning calorimetry) using a Mettler DSC 12E (Mettler Toledo GmbH, Giessen, DE) at a heating rate of 20° C./minute.

Shore hardnesses were measured according to DIN 53505 by means of a Zwick 3100 Shore hardness tester (Zwick, DE).

Measurement of the refractive indices and the Abbe coefficients was carried out on a model B Abbe refractometer from Zeiss.

Starting Compounds

Polyisocyanate a1-I)

HDI polyisocyanate containing isocyanurate groups, prepared according to Example 11 of EP-A 330 966, with the difference that 2-ethylhexanol was used as the catalyst solvent instead of 2-ethyl-1,3-hexanediol.

NCO content: 22.9%
NCO functionality: 3.2
Monomeric HDI: 0.1%
Viscosity (23° C.): 1200 mPas Polyisocyanate a1-II)

HDI polyisocyanate containing isocyanurate and iminooxadiazinedione groups, prepared according to Example 4 of EP-A 0 962 455 by trimerisation of HDI using a 50% solution of tetrabutylphosphonium hydrogen difluoride in isopropanol/methanol (2:1) as catalyst, the reaction being stopped at an NCO content of the crude mixture of 43% by addition of dibutyl phosphate, and the unreacted HDI then being separated off by thin-layer distillation at a temperature of 130° C. and a pressure of 0.2 mbar.

NCO content: 23.4%
NCO functionality: 3.2
Monomeric HDI: 0.2%
Viscosity (23° C.): 700 mPas Polyisocyanate a1-III)

HDI polyisocyanate containing isocyanurate and uretdione groups, prepared by tributylphosphine-catalysed oligomerisation according to Example 1a) of EP-A 0 377 177, with the difference that no 2,2,4-trimethyl-1,3-pentanediol was used concomitantly. The reaction was terminated at an NCO content of 42% and unreacted HDI was removed by thin-layer distillation at a temperature of 130° C. and a pressure of 0.2 mbar.

NCO content: 22.7%
NCO functionality: 2.2
Monomeric HDI: 0.3%
Viscosity (23° C.): 90 mPas Polyisocyanate a2-I)

According to the process described in EP-A 0 157 088, Example 6, 2256 g (12 mol) of 1,3-bis(isocyanatomethyl)benzene (m-XDI) were reacted with 18 g (1 mol) of water in the presence of 46.5 g (0.25 mol) of pivalic anhydride and 200 g of triethyl phosphate to give a biuret polyisocyanate.

Excess m-XDI was then removed by thin-layer distillation at a temperature of 150° C. and a pressure of 0.1 mbar. A high-viscosity, weakly yellow-coloured resin was obtained.
NCO content: 21.1%
NCO functionality: 3.3
Monomeric m-XDI: 0.3%
Viscosity (23° C.): 182,000 mPas Polyisocyanate a2-II)

1.4 g (7 mmol) of tributylphosphine were added, as catalyst, to 940 g (5.0 mol) of m-XDI at room temperature, under nitrogen and with stirring, and the mixture was then heated to 60° C. After about one hour, the NCO content of the mixture had fallen to 26.4% and the reaction was terminated by addition of 1.3 g (7 mmol) of toluenesulfonic acid methyl ester and heating for one hour at 80° C. After separation of the unreacted excess m-XDI by thin-layer distillation at a temperature of 150° C. and a pressure of 0.1 mbar, a polyisocyanate containing isocyanurate and uretdione groups was obtained in the form of a glass-like, almost colourless resin.
NCO content: 17.4%
NCO functionality: 2.4
Monomeric m-XDI: 0.2%

Polyisocyanate a2-III)

179 g (1.3 mol) of trimethylolpropane were added in the course of 30 minutes at 50° C., under nitrogen and with stirring, to 1880 g (10 mol) of m-XDI, and then the mixture was heated at 60° C. until, after about 4 hours, the NCO content of the reaction mixture had fallen to 32.6%. Excess m-XDI was then removed by thin-layer distillation at a temperature of 160° C. and a pressure of 0.3 mbar. A glass-like, solid resin having the following characteristic data was obtained:
NCO content: 15.1%
NCO functionality: 3.2
Monomeric m-XDI: 0.3%

Polyisocyanate a2-IV)

m-XDI polyisocyanate containing isocyanurate and iminooxadiazinedione groups, prepared by the process described in Example 4 of EP-A 0 962 455 by trimerisation of m-XDI using a 50% solution of tetrabutylphosphonium hydrogen difluoride in isopropanol/methanol (2:1) as catalyst, the reaction being stopped at an NCO content of the crude mixture of 36% by addition of dibutyl phosphate. After separation of the unreacted m-XDI by thin-layer distillation at a temperature of 150° C. and a pressure of 0.1 mbar, a glass-like, solid resin having the following characteristic data was obtained:
NCO content: 20.4%
NCO functionality: 3.2
Monomeric m-XDI: 0.1%
Viscosity (60° C.): 8500 mPas Hydroxy-Functional Reactant B1)

Solvent-free polyester polyol, prepared as described in WO 2010/083958 under starting compounds as hydroxy-functional reactant B1).
Viscosity (23° C.): 19,900 mPas
OH number: 628 mg KOH/g
Acid number: 2.2 mg KOH/g
OH functionality: 2.6
Mean molecular weight: 243 g/mol (calculated from OH number)

Mercapto-Functional Reactant B2)

Pentaerythritol tetrakis(3-mercaptopropionate) (=THIOCURE® PETMP, Bruno Bock, DE)
Equivalent weight: 122.2 g/val SH Examples 1 to 7

The solid or high-viscosity polyisocyanates of type a2) based on araliphatic diisocyanates were placed in a reaction vessel at room temperature together with the low-viscosity HDI polyisocyanate of type a1) under an N2 atmosphere. In order to dissolve the high-viscosity or solid resin and homogenise the mixture, it was heated to 100-140° C. and stirred until an almost clear solution was obtained. The mixture was then cooled to 50° C. and filtered over a 200 μm filter.

Table 1 below shows compositions (parts by weight) and characteristic data of polyisocyanates A1 to A6 according to the invention prepared in that manner.

TABLE 1

| Example | 1 | 2 | 3 | 4 | 5 | 6 | 7 |
|---|---|---|---|---|---|---|---|
| Polyisocyanate | A1) | A2) | A3) | A4) | A5) | A6) | A7) |
| Polyisocyanate a1 - I) | 55 | 25 | — | — | — | 70 | — |
| Polyisocyanate a1 - II) | — | — | — | — | — | — | 50 |
| Polyisocyanate a1 - III) | — | — | 10 | 25 | 10 | — | — |
| Polyisocyanate a2 - I) | 45 | 75 | 90 | — | — | — | — |
| Polyisocyanate a2 - II) | — | — | — | 75 | — | — | — |
| Polyisocyanate a2 - III) | — | — | — | — | 90 | — | — |
| Polyisocyanate a2 - IV) | — | — | — | — | — | 30 | 50 |
| NCO content [%] | 22.1 | 21.6 | 21.3 | 18.7 | 20.6 | 20.4 | 19.4 |
| NCO functionality | 3.2 | 3.3 | 2.6 | 2.5 | 3.0 | 3.2 | 3.2 |
| Viscosity (23°) [mPas] | 13,800 | 33,800 | 90,000 | 86,000 | solid | 14,500 | 61,200 |
| Viscosity (50°) [mPas] | 1360 | 3600 | 3000 | 3700 | 6200 | 1400 | 3400 |
| Refractive index $n_D^{20}$ | 1.5452 | 1.5693 | 1.5849 | 1.5694 | 1.5882 | 1.5211 | 1.5349 |

Examples 8 to 15

Production of Polyurethane Casting Compositions

For the production of casting compositions, polyisocyanate mixtures A) and polyol components B) according to the invention, preheated to 50° C., in the combinations and relative proportions (parts by weight) indicated in Table 2, in each case corresponding to an equivalent ratio of isocyanate groups to isocyanate-reactive groups of 1:1, were homogenised for one minute at 3500 rpm by means of a SpeedMixer DAC 150 FVZ (Hauschild, DE) and then poured by hand into open, unheated polypropylene moulds. After curing for 24 hours at 70° C. in a drying cabinet, the test specimens (diameter 50 mm, height 5 mm) were removed from the moulds.

After a post-curing time of a further 24 hours at room temperature, the mechanical and optical properties of the test specimens were tested. The test results are likewise to be found in Table 2.

TABLE 2

| Example | 8 | 9 | 10 | 11 | 12 | 13 | 14 | 15 |
|---|---|---|---|---|---|---|---|---|
| Polyisocyanate A1) | — | — | 60.9 | — | — | — | — | — |
| Polyisocyanate A2) | — | — | — | 61.4 | — | — | — | — |
| Polyisocyanate A3) | — | — | — | — | 61.7 | — | — | — |
| Polyisocyanate A4) | — | — | — | — | — | 64.8 | — | — |
| Polyisocyanate A5) | 69.6 | — | — | — | — | — | 62.5 | — |
| Polyisocyanate A6) | — | 69.8 | — | — | — | — | — | — |
| Polyisocyanate A7) | — | — | — | — | — | — | — | 63.5 |
| Reactant B1) | 30.4 | 30.2 | — | — | — | — | — | — |
| Reactant B2) | — | — | 39.1 | 38.6 | 38.3 | 35.2 | 37.5 | 36.5 |
| Appearance | clear | clear | clear | clear | clear | clear | clear | clear |
| Tg [° C.] | 117 | 76 | 81 | 92 | 102 | 86 | 117 | 79 |
| Shore hardness D | 90 | 81 | 81 | 90 | 78 | 87 | 81 | 83 |
| Refractive index $n_D^{20}$ | 1.5713 | 1.5328 | 1.5722 | 1.5885 | 1.5949 | 1.5887 | 1.5888 | 1.5637 |
| Abbe coefficient | 37.3 | 43.3 | 52.0 | 51.2 | 51.9 | 51.2 | 38.1 | 40.3 |

The invention claimed is:

1. A solvent-free polyisocyanate mixture A) comprising:
   5 to 95 wt.% based on a total wt. of polyisocyanate mixture A) of at least one polyisocyanate a-1), said at least one polyisocyanate a-1) being based on hexamethylene diisocyanate, said at least one polyisocyanate a-1) having an NCO content of from 16 to 24 wt.% based on a total wt. of polyisocyanate a-1), and said at least one polyisocyanate a-1) exhibiting a viscosity at 23° C. of from 70 to 12,000 mPas; and
   95 to 5 wt.% based on a total wt. of polyisocyanate mixture A) of at least one polyisocyanate a-2), said at least one polyisocyanate a-2) being based on araliphatic diisocyanate, said at least one polyisocyanate a-2) having an NCO content of from 10 to 22 wt.% based on a total wt. of polyisocyanate a-2), said at least one polyisocyanate a-2) having a monomer araliphatic diisocyanate content of less than 1.0 wt.% based on a total wt. of polyisocyanate a-2), and said at least one polyisocyanate a-2) either being a solid at 23° C. or exhibiting a viscosity at 23° C. of more than 150,000 mPas;
   said at least one polyisocyanate a-1) being different from said at least one polyisocyanate a-2); and
   said polyisocyanate mixture A) having a total content of isocyanate groups of from 11 to 23 wt.% based on a total wt. of polyisocyanate mixture A), said polyisocyanate mixture A) having a mean isocyanate functionality of at least 2.3, and said polyisocyanate mixture A) having a monomeric diisocyanate content of less than 1 wt.% based on a total wt. of polyisocyanate mixture A).

2. Polyisocyanate mixtures A) according to claim 1, wherein the polyisocyanates of component a-1) have a viscosity at 23° C. of from 70 to 1600 mPas and a content of isocyanate groups of from 18 to 24 wt.%.

3. Polyisocyanate mixtures A) according to claim 1, wherein the polyisocyanates of component a-2) are those with a uretdione, allophanate, isocyanurate, iminooxadiazinedione and/or biuret structure.

4. Polyisocyanate mixtures A) according to claim 3, wherein the polyisocyanates of component a-2) are those based on m-xylylene diisocyanate (m-XDI), p-xylylene diisocyanate (p-XDI) and/or m-tetramethylxylylene diisocyanate (m-TMXDI) having a content of isocyanate groups of from 11 to 21.5 wt.% and a content of monomeric diisocyanates of less than 0.8%.

5. Polyisocyanate mixtures A) according to claim 3, wherein the polyisocyanates of component a-2) are those based on m-xylylene diisocyanate (m-XDI) having a content of isocyanate groups of from 15 to 21 wt.% and a content of monomeric m-XDI of less than 0.5%.

6. Process for the production of light-fast polyurethane compositions comprising solvent-free reacting of
   A) the solvent-free polyisocyanate mixtures according to claim 1 with
   B) reactants that are reactive towards isocyanate groups and have a mean functionality of from 2.0 to 6.0, optionally with the concomitant use of
   C) further auxiliary substances and additives,
   while maintaining an equivalent ratio of isocyanate groups to isocyanate-reactive groups of from 0.5:1 to 2.0:1.

7. Process according to claim 6, wherein the reactants B) that are reactive towards isocyanate groups are hydroxy-, amino- and/or mercapto-functional compounds having a mean molecular weight of from 60 to 12,000.

8. Process according to claim 6, wherein there are used as the reactants B) that are reactive towards isocyanate groups polyether polyols, polyester polyols, polycarbonate polyols and/or amino polyethers having a mean molecular weight of from 106 to 12,000, polythioether thiols, polyester thiols, sulfur-containing hydroxy compounds and/or low molecular weight hydroxy- and/or amino-functional components having a mean molecular weight of from 60 to 500.

9. Process according to claim 6, wherein there are used as auxiliary substances and additives catalysts, UV stabilisers, antioxidants and/or mould release agents.

10. Process according to claim 6, wherein the reacting of the reactants is carried out at a temperature of up to 180° C. and a pressure of up to 300 bar.

* * * * *